United States Patent [19]

Chestnut et al.

[11] Patent Number: 4,901,411

[45] Date of Patent: Feb. 20, 1990

[54] APPARATUS FOR PARTIAL DISASSEMBLY OF FIREARM

[75] Inventors: M. Gaines Chestnut, Kremmling, Colo.; Ernest Brandenburg, Dallas, Tex.

[73] Assignee: Ram-Line, Inc., Golden, Colo.

[21] Appl. No.: 232,807

[22] Filed: Aug. 16, 1988

[51] Int. Cl.[4] .............................................. B23P 13/00

[52] U.S. Cl. .............................................. 29/1.1; 42/90

[58] Field of Search .................... 29/1.1; 7/118; 42/59, 42/77, 106, 90; 89/14.3

[56] References Cited

U.S. PATENT DOCUMENTS 4,817,321 4/1989 Clement .................................. 42/90

OTHER PUBLICATIONS

Instruction Manual for Colt .45 Pistol, pp. 26 and 27.

Advertisements for "Smokey ILL .45 Bushing Wrench" and Brownell's Colt Wrench.

*Primary Examiner*—Timothy V. Eley

*Attorney, Agent, or Firm*—Sheridan, Ross & McIntosh

[57] ABSTRACT

A tool for rotating a barrel bushing or a spring plug, such as in a .45 pistol, is provided. The tool has a wide flange to prevent uncontrolled ejection of the freed plug and spring. The tool includes a recess for partially receiving the ejected plug. Studs are positioned to control the amount and/or direction of rotation of the bushing or plug.

23 Claims, 7 Drawing Sheets

APPARATUS FOR PARTIAL DISASSEMBLY OF FIREARM

FIELD OF THE INVENTION

This invention relates to a tool usable for partial disassembly of a firearm and in particular to a tool for rotation and/or removal of a barrel bushing and/or plug.

BACKGROUND INFORMATION

Many firearms are constructed to accommodate disassembly or partial disassembly for purposes such as cleaning, oiling, inspection, bluing, and repair. Examples of such a firearm include a .45 caliber pistol including "government model" MK IV/Series 80 and an "officer's model", officer's ACP both manufactured by Colt, Model 1911-A1 manufactured by Springfield Armory, and models made by AMT, Auto Ordinance, Caspian, Crown City, Detronics, Falcon, Federal Ordinance Ranger, Randall and Vega. In these firearms, part of the disassembly procedure includes rotation and/or removal of a barrel bushing and/or a plug such as a recoil spring plug. Rotation and/or disassembly of these parts can be accomplished by hand without use of any tools. However, such rotation and/or disassembly is somewhat difficult without the use of tools. For example, the procedure with respect to the government model firearm includes pushing the slide portion back, about ¼", pressing down on the recoil spring plug and at the same time rotating the barrel bushing clockwise by about ¼ turn. The pushing back of the slide is not absolutely necessary but does facilitate rotation of the barrel bushing. After the barrel bushing has been rotated the plug will be freed and the spring underlying the plug will tend to eject the plug from the firearm. Therefore, it is necessary to keep pressure on the plug to prevent it from being ejected by the spring and being possibly lost or striking an object. The plug is then allowed to gradually extend out of the slide portion of the firearm by gradually reducing the pressure on the plug. The manual procedure described is somewhat difficult because of the necessity to press the plug and rotate the barrel and because of the strength or torque needed to accomplish rotation of the barrel bushing. Therefore, a tool is sometimes used in connection with rotating the barrel bushing. Typically, this tool is a generally flat piece having a cutout or opening generally of the shape of the barrel bushing which is fitted over the barrel bushing and turned to rotate the barrel bushing.

A difficulty with respect to the tools which have been used is that they do not adequately restrain the exit of the plug after the rotation of the barrel bushing. Another difficulty of the tools previously used is that they do not restrain or direct the amount or direction of rotation of the barrel bushing. Yet another difficulty of the previously available tools is that they do not provide for partial exit of the plug without manipulation or movement of the tool itself away from the firearm. As a result of these insufficiencies, when using such tools, the plug may be difficult to safely remove, and may unexpectedly be ejected from the firearm and become lost or may strike an object or person. Also, the user of the tool may be able to use the tool to rotate the barrel bushing in the wrong direction or may be able to use the tool to overrotate or underrotate the barrel bushing thus frustrating the object of disassemblying the firearm.

With respect to disassembly of the officer's model firearm, the initial steps are similar to those described above in connection with the government model, namely, the recoil spring plug is depressed and rotated about 90° in a clockwise direction. The plug in this position remains in a depressed condition. The barrel bushing is rotated about ¼ turn. In this case, the barrel bushing is rotated counterclockwise rather than clockwise.

With respect to this initial portion of the disassembly, it may be possible to use tools for rotation of the barrel bushing and/or plug. As noted above, however, previously used tools do not limit the amount or direction of rotation of the barrel bushing.

After the officer's model barrel bushing is rotated, the bushing is pulled forward and out of the firearm. Next, the recoil spring plug is then turned about another ¼ turn clockwise. A screwdriver can be used for this purpose. The spring plug is then freed and is biased towards expulsion from the firearm. Accordingly, the spring force must be controlled carefully to allow the spring plug and the two recoil springs to extend out of the slide and to be removed. Although an ordinary screwdriver can be used in connection with depressing and rotating the recoil spring plug, the screwdriver does not control or determine the depth of depression of the plug and does not control the amount or direction of rotation of the plug. Furthermore, as the plug is released there is no device on the ordinary screwdriver for preventing or restraining ejection and/or the direction of ejection of the plug out of the firearm.

Accordingly, it would be advantageous to provide a tool for use in partial disassembly of a firearm which controls or prevents premature or uncontrolled ejection of the spring plug. It would further be advantageous to provide a tool which controls the amount and/or direction of rotation of the barrel bushing and/or the spring plug. Further, it would be advantageous to provide a tool which permits partial release of the spring plug upon rotation of the barrel bushing for controlled removal of the spring plug.

It would be further advantageous to provide a tool which is useful in connection with both the rotation of the barrel bushing and the rotation of the plug. It also would be advantageous to provide the tool which can be used in connection both with an officer's style firearm and a government style firearm.

SUMMARY OF THE INVENTION

The present invention relates to a tool for use in partial disassembly and/or rotation of parts in a firearm. The tool includes a device for restraining premature or controlled ejection of the spring plug. One aspect of this control is a flange of sufficient width and positioned such that, upon rotation of the barrel bushing, the flange substantially completely covers the plug to prevent its ejection in an uncontrolled manner. Another aspect involves provision of a receiving means such as a recess in a flange for allowing partial ejection of the plug into the recess.

Another aspect of the tool involves providing portions which control or direct the amount of rotation of the tool and thus the amount of the rotation of the barrel bushing and/or plug. One aspect of rotation control is one or more studs which are located to contact a portion of the firearm when the proper rotation has been achieved. Another aspect is a recess such as that described above wherein, when the proper rotation has been achieved and the plug has been received in the recess or receiving area, further rotation is prevented by interaction of the plug with the walls of the receiving area.

The invention also relates to a tool having a ridge which interacts with the slot of a slotted plug in a screwdriver-like fashion. The ridge is positioned on a post having a height which controls the amount of depression of the plug. Rotation of the plug, as described above, can be controlled such as by one or more studs positioned to strike the firearm when the plug has been rotated to the desired position.

DETAILED DESCRIPTION

Figure 1:
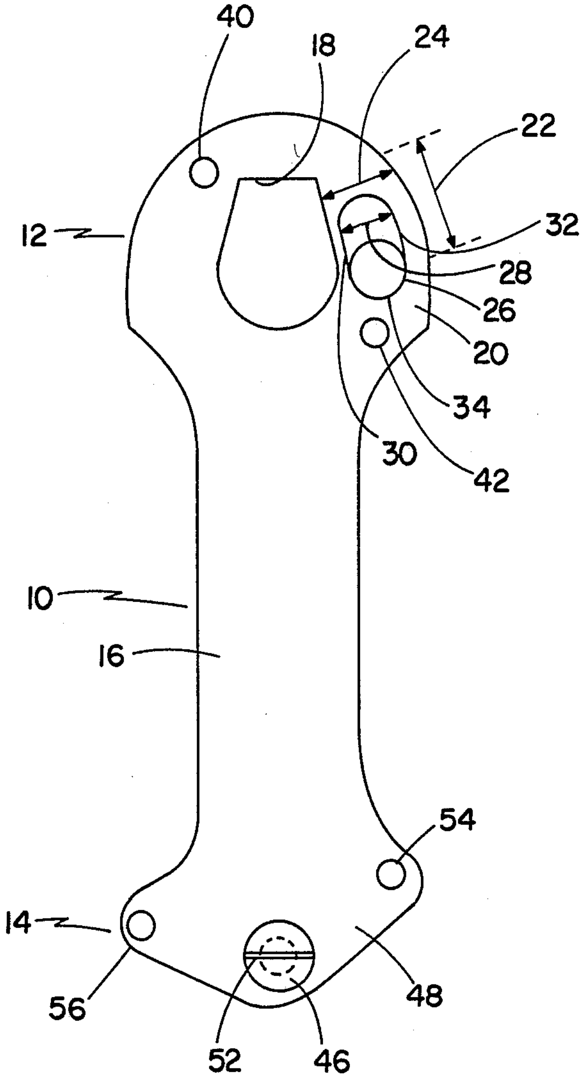
FIG. 1 is a plan view of a tool according to the present invention.

Referring now to FIG. 1, a tool 10 is depicted which includes a first end 12 and a second end 14 connected by a handle portion 16. The tool 10 can be formed of a number of materials having the necessary stiffness and strength. The preferred material is injected molded plastic. Other possible materials include metal, wood, plaster and rubber.

The first end 12 includes an opening 18 configured to engage a barrel bushing. The exact configuration of the opening 18 will depend upon the shape of the barrel bushing which the tool is designed to rotate. The opening 18 can be configured to engage more than one shape of barrel bushing provided the tool provides sufficient gripping or grasping action on the barrel bushing to effect rotation. Surrounding the opening 18 is a flange 20. The flange 20 extends outward from the opening 18. The flange 20 need not completely surround or extend away from the opening 18, provided at least a portion 22 of the flange 20 extends outward from that portion of the opening 18 which will be adjacent to or above the plug after the barrel bushing has been rotated to the plug unlocking position, as described above. In the portion 22 of the flange 20 which will overlie the plug after it has been unlocked or freed, the flange 20 has sufficient width 24, i.e. extension in the direction laterally away from the opening 18, that the flange 20 in this portion substantially overlies the plug. For a tool used in connection with the government model described above, the width 24 should be at least about ⅜", preferably about ½".

Also in the region 22 of the flange 20 which will overlie the freed plug, a recess 26 is provided by, for example, formation in the flange 20. The recess 26 is of substantially arcuate shape and has a width 28 at least as wide as the diameter of the plug it is to receive. In the tool for use with respect to the government model, the width 28 is about 0.39 inches.

Figure 2:
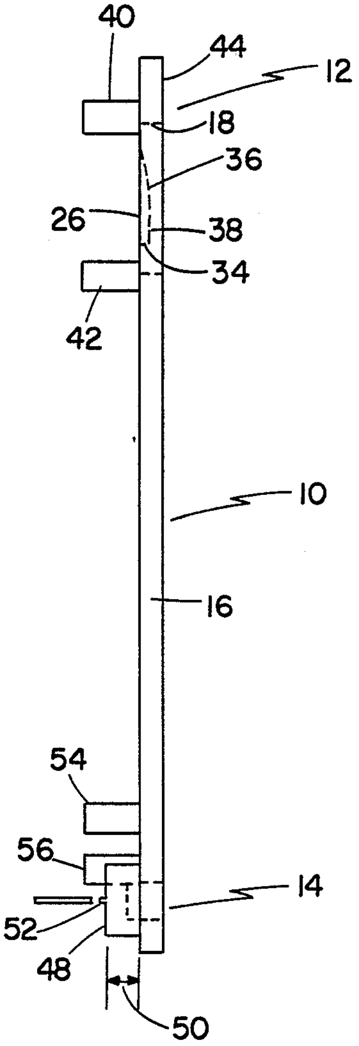
FIG. 2 is a side view of the embodiment depicted in FIG. 1.

The recess 26 is defined by two arcuate side walls 30, 32 a generally semi-circular end wall 34 and, as best seen in FIG. 2, a bottom surface which includes a slanted portion 36 and a flat portion 38. The bottom wall is partly slanted 36 in order that the plug, when it is released during rotation of the barrel bushing can be gradually extended into the recess 26 by riding along the slanted surface 36 to eventually be received against the flat surface 38. The depth of the recess 26 in the portion of the flat surface 38 of a tool for use in connection with the government model is about 0.05 inches.

Figure 4:
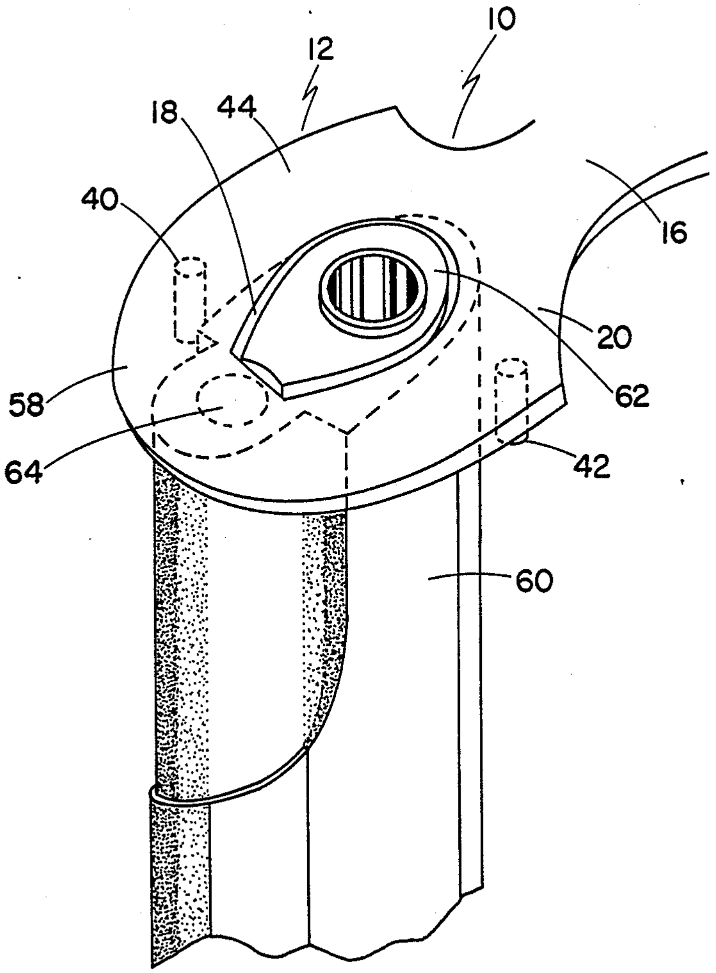
FIG. 4 is a perspective view of a portion of the tool engaged with the barrel bushing of a firearm.
Figure 5:
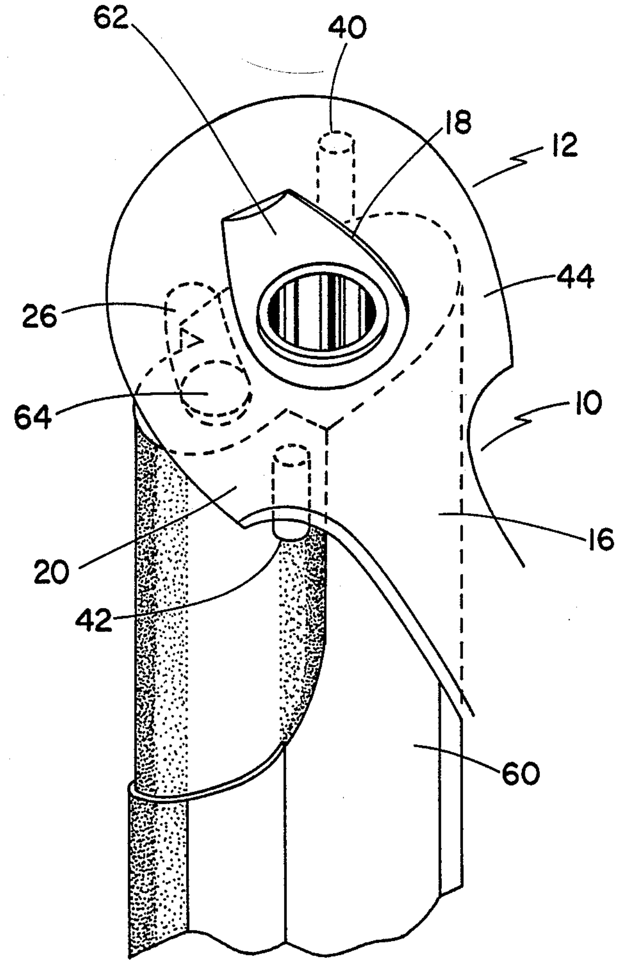
FIG. 5 is a perspective view similar to FIG. 4 but with the tool portion and barrel bushing rotated.

Extending from the flange portion 20 of the first end 12 are first and second studs 40, 42. The first stud 40 is positioned such that, as best seen in FIG. 4, when the tool is positioned over the barrel bushing, the first stud 40 contacts a portion of the firearm, preventing rotation in the counterclockwise direction (as seen from above in FIG. 4) and thus permitting direction only in the desired clockwise direction. The second stud 42 is positioned such that, as best seen in FIG. 5, when the barrel bushing has been rotated about ¼ turn, the second stud 42 contacts the firearm preventing further rotation, i.e. preventing rotation beyond the ¼ turn position of the barrel bushing.

As noted above, the officer's model requires rotation of the bushing in the counterclockwise rather than in a clockwise direction. Accordingly, the positioning of the studs 40, 42 can be such that rotation in the counterclockwise direction is allowed for use in connection with the officer's model, while still preventing overrotation. Alternatively, the tool can be provided with studs (not shown) on the opposite side 44 of the tool, positioned so that the tool in one orientation can be used for the government model and in the other orientation for the officer's model. Further, a tool can be provided with only one stud to prevent overrotation, but without studs to prevent rotation in an undesired direction.

The second end 14 of the tool 10 includes a post 46 extending from a second end flange 48. The post 46 is circular in cross section and configured to fit within the recess where the depressable slotted slug of the officer's model lies. The height 48 of the post 46 is determined such that when the post 46 is fully inserted in the plug recess of the firearm (i.e., until the second end flange 48 contacts the firearm), the plug will be correctly depressed, i.e. will be depressed a distance about equal to the height 50 of the post 46. A ridge 52 of a screwdriver-like shape is formed on the outer surface of the post 46 for engagement with the slot of the slotted depressable plug. A tool for use in connection with the officer's model has a height 50 of about 0.215 inches.

Figure 8:
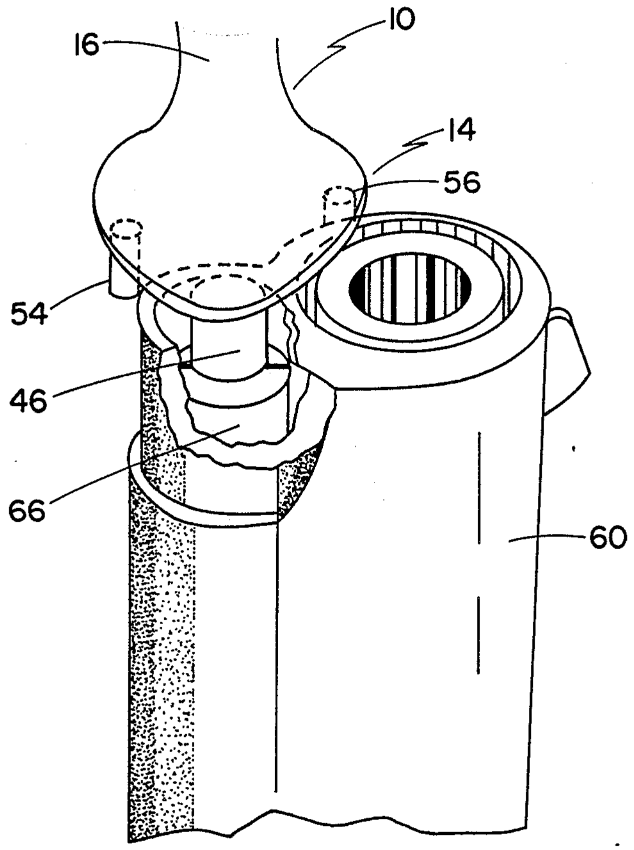
FIG. 8 is a perspective view of a portion of the tool and a firearm with a portion broken away to show the tool engaged with the plug which is in a depressed position and rotated.

Extending outward from the flange 48 of the second end 14 are third and fourth studs 54, 56. As noted above, the slotted rotatable plug of the officer's model can be rotated either clockwise or counterclockwise but should be rotated approximately ½ turn. Accordingly, the studs 54, 56 are positioned so that when the plug has been rotated approximately ½ turn, for example clockwise as depicted in FIG. 8, a stud 56 will contact a portion of the firearm and prevent further rotation.

Figure 3:
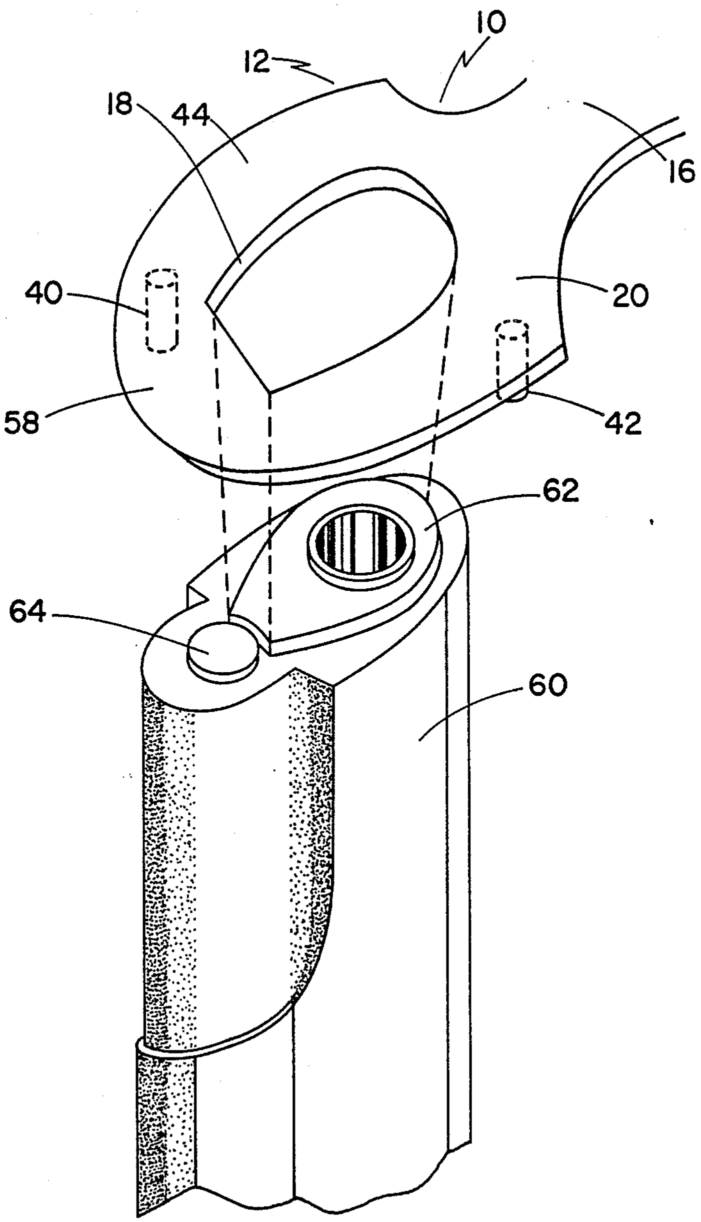
FIG. 3 is a perspective view of the tool adjacent to a firearm.

The manner of use of the tool 10 will now be described. When used in connection with the government model, as shown in FIG. 3, the tool 10 is positioned adjacent to the firearm 60 such that the opening 18 is aligned with the barrel bushing 62 and, preferably, a portion 58 of the flange 20 is aligned with the plug 64.

As depicted in FIG. 4, the tool 10 is engaged with the barrel bushing 62 such that the edges of the opening 18 engage the edges of the barrel bushing 62. Simultaneously a portion 58 of the flange 20 contacts the plug 64 and pushes the plug downward and into the firearm. As shown in FIG. 5, the tool 10 is rotated clockwise (as seen from above), causing accompanying rotation of the barrel bushing 62. When the barrel bushing 62 has been sufficiently rotated to free or release the spring-loaded plug 64, the plug is received into the recess 26. Continued rotation of the tool 10 causes the upper surface of the plug 64 to ride along the slanted surface 36 of the recess 26 and to eventually be received in the flat walled 38 portion of the recess 26. At this point, further rotation of the tool 10 is restrained by bearing of the partly-ejected plug 64 against the end wall 34 and/or sidewalls 30, 32 of the recess 26. Also, further rotation is prevented by engagement of the second stud 42 against a portion of the firearm 60. The flange and/or recess of the tool in this manner prevents unrestrained or uncontrolled ejection of the plug from the firearm such as can occur if the flange 20 is otherwise placed or is too narrow.

Figure 6:
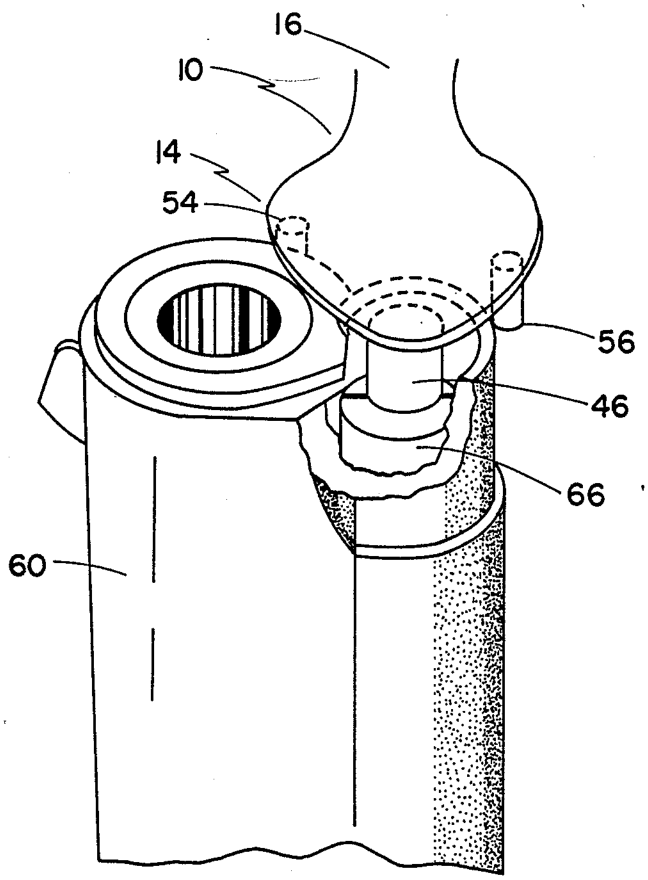
FIG. 6 is a perspective view of a portion of the tool adjacent a portion of a firearm.
Figure 7:
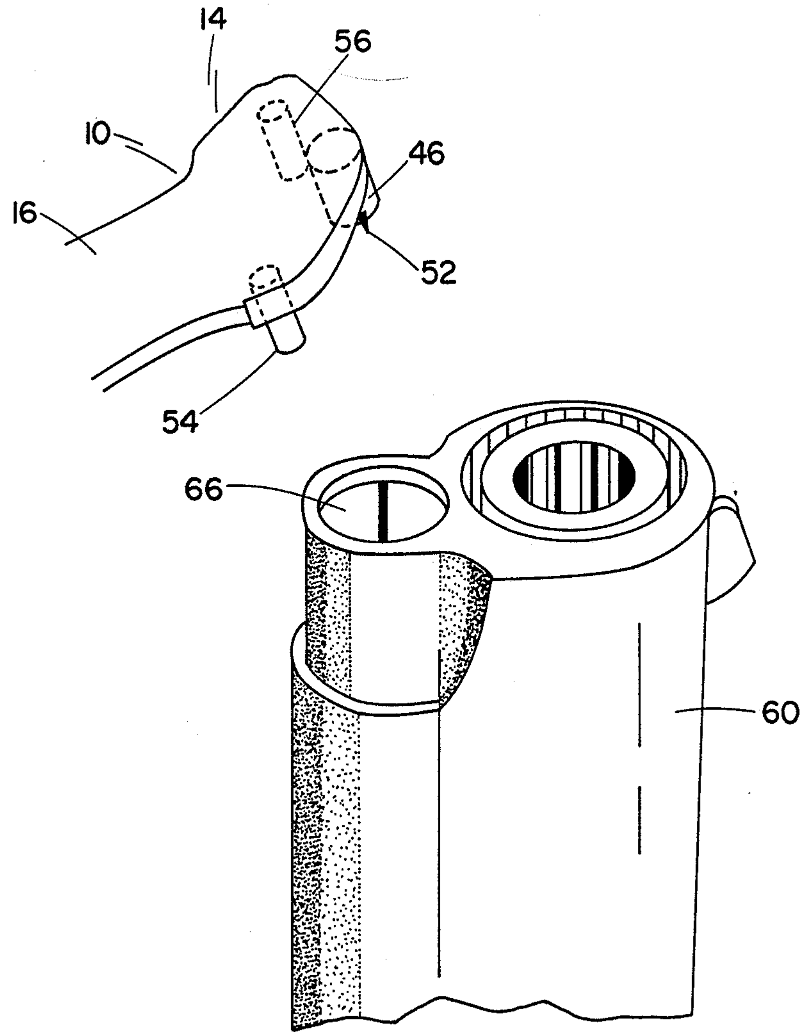
FIG. 7 is a perspective view of a portion of the tool engaged with a plug which is not yet depressed.

In connection with the officer's model, the second end 14 of the tool is brought adjacent to the slotted rotatable plug 66. As depicted in FIG. 6, the ridge 52 is engaged with the slot 68 of the plug 66. The tool 10 is then pressed down so that the post 46 causes the plug 66 to be pushed downward into the firearm 60 a depth determined by the height of the post 46. The plug is rotated about ¼ turn to the position depicted in FIG. 7. The tool 10 is removed, with the plug 66 remaining in the depressed position. Next, the barrel bushing is rotated counterclockwise about ¼ turn, either by hand or using the tool substantially as described above. Once the barrel bushing is rotated, either manually or using a tool, the barrel bushing is removed. As depicted in FIG. 8, the tool is then further rotated about ¼ turn, thus rotating the plug 66 until the second post 56 contacts a portion of the firearm 60 preventing further rotation. The plug 66 at this point is released but is prevented from free or unrestrained exit from the firearm at least partially by the flange 48 and/or post 46. The tool 10 is gradually withdrawn to control the exit of the plug 66 from the firearm.

As will be apparent from the above description, a number of advantages of the present invention can be seen. The tool 10 provides for control of the exit of the spring loaded plug from the firearm by a sufficiently wide flange to substantially overlie the plug or portions thereof and a recess for receiving the partially exiting plug. The tool includes studs for preventing overrotation and/or rotation in an undesired direction. The tool causes proper depression of the officer's model plug a predetermined depth The tool can be used for disassembly of both an officer's model and government model firearm with one tool.

As will be apparent to those in the art, a number of variations and modifications of the invention can also be used. Protrusions or devices other than the studs as depicted can be used to control the amount or direction of rotation including fixed or adjustable ribs, ridges, or brackets. The opening 18 can be of a "box end" type as depicted, or can be an "open end type" provided it sufficiently engages the barrel bushing to achieve rotation. The second (officer's) end 14 and first (government) 12 end of the tool can be provided on the same portion or on opposite sides of the same end of the tool. The tool can be made in collapsible or foldable form. The tool can be provided with only the officer's end or only the government end. The tool can be provided without all of the described features, such as without studs, and/or without a flange and/or without a recess.

Although the present invention has been described with reference to certain embodiments it should be appreciated that further modifications can be effected within the spirit and scope of the invention as limited only by the appended claims.

What is claimed is:

1. Apparatus usable in rotating a barrel bushing of a firearm having a depressable plug adjacent to said barrel bushing comprising:

- means for engaging a barrel bushing wherein rotation of said means for engaging is accompanied by rotation of said barrel bushing;
- means, operatively connected to said means for engaging, for rotating said means for engaging wherein said barrel bushing is rotated from a first position to a second position;
- flange means extending outward from said means for engaging wherein said flange means substantially overlies the depressable plug when said barrel bushing is rotated to said second position.

2. Apparatus, as claimed in claim 1, wherein said flange means includes:

- recess means for receiving a portion of said depressable plug.

3. Apparatus, as claimed in claim 1, further comprising:

- at least one stud operatively attached to said means for engaging positioned to contact a portion of the firearm when said means for engaging has been rotated to place said barrel bushing in said second position for preventing rotation beyond said second position.

4. Apparatus, as claimed in claim 1, wherein said flange means had a width of at least about ⅜" for a portion of its extent.

5. Apparatus, as claimed in claim 1, wherein said flange means has a width of at least about ½" for a portion of its extent.

6. Apparatus usable in rotating a barrel bushing of a firearm having a depressable plug proximate to said barrel bushing comprising:

- means for engaging a barrel bushing wherein rotation of said means for engaging is accompanied by rotation of the barrel bushing;
- means, operatively connected to said means for engaging, for rotating said means for engaging wherein said barrel bushing is rotated from a first position to a second position; and
- means for receiving a portion of said depressable plug when said means for engaging is rotated to place said barrel bushing in said second position.

7. Apparatus, as claimed in claim 6, wherein said means for receiving includes recess means formed in a substantially planar-surface flange extending outward from said means for engaging.

8. Apparatus, as claimed in claim 7, wherein said recess is partly defined by a wall which is inclined to the plane of said substantially planar-surface flange.

9. Apparatus, as claimed in claim 6, further comprising:

- means for depressing said depressable plug by moving said plug in a first direction; and means permitting movement of said depressable plug in a second direction, substantially opposite to said first direction while said means for engaging is rotated.

10. Apparatus, as claimed in claim 6, further comprising:

flange means extending outward from said means for engaging wherein said flange means substantially overlies the depressable plug during at least a portion of said rotation of said means for engaging.

11. Apparatus usable in rotating a barrel bushing of a firearm having a depressable plug proximate to said barrel bushing comprising:

means for engaging a barrel bushing wherein rotation of said means for engaging is accompanied by rotation of the barrel bushing;

means, operatively connected to said means for engaging, for rotating said means for engaging wherein said barrel bushing is rotated from a first position to a second position;

means for substantially preventing rotation of said means for engaging beyond the point at which said barrel bushing is in said second position;

12. Apparatus, as claimed in claim 11, wherein said means for preventing rotation includes:

means for receiving at least a portion of said depressable plug.

13. Apparatus, as claimed in claim 11, wherein said means for preventing rotation includes:

at least a first stud operatively attached to said means for engaging and positioned to contact a portion of the firearm when said means for engaging is rotated to place said barrel bushing in said second position.

14. Apparatus usable for rotating a barrel bushing of a firearm having a depressable plug proximate to said barrel bushing comprising:

means for engaging a barrel bushing wherein rotation of said means for engaging is accompanied by rotation of the barrel bushing;

means, operatively connected to said means for engaging, for rotating said means for engaging wherein said barrel bushing is rotated from a first position to a second position;

flange means extending outward from said means for engaging wherein said flange means substantially overlies the depressable plug during at least a portion of said rotation of said means for engaging;

recess means formed in said flange means for receiving said depressable plug when said means for engaging is rotated to place said barrel bushing in said second position;

at least one stud extending from said flange means and positioned to contact a portion of the firearm when said means for engaging is rotated to place said barrel bushing in said second position.

15. Apparatus useful in rotating a slotted rotatable plug of a firearm comprising:

means for engaging the slot of a slotted rotatable plug wherein rotation of said means for engaging is accompanied by rotation of said plug;

means, operatively connected to said means for engaging, for rotating said means for engaging wherein said slotted plug is rotated from a first position to a second position; and means for depressing said rotatable plug a predetermined depth.

16. An apparatus, as claimed in claim 15, further comprising:

means for substantially preventing rotation of said means for engaging beyond the point at which said rotatable plug is in said second position.

17. Apparatus, as claimed in claim 16, wherein said means for substantially preventing rotation includes:

at least one stud attached to said means for engaging and positioned to contact a portion of the firearm when said means for engaging has been rotated to the point at which said slotted plug is in said second position.

18. Apparatus usable in rotating a slotted rotatable plug of a firearm comprising:

means for engaging the slot of a slotted rotatable plug wherein rotation of said means for engaging is accompanied by rotation of said slotted rotatable plug;

means, operatively connected to said means for engaging, for rotating said means for engaging wherein said slotted rotatable plug is rotated from a first position to a second position; and means for substantially preventing rotation of said means for engaging beyond the point at which said slotted rotatable plug has been placed in said second position.

19. Apparatus, as claimed in claim 18, wherein said means for preventing rotation includes:

at least one stud operatively attached to said means for engaging and positioned to contact a portion of said firearm when said means for engaging has been rotated to place said slotted rotatable plug in said second position.

20. An apparatus, as claimed in claim 18, further comprising:

means for depressing said slotted rotatable plug a predetermined depth.

21. Apparatus useful in disassembling a firearm comprising:

means for rotating a barrel bushing of a firearm including means for engaging the barrel bushing wherein rotation of said means for engaging is accompanied by rotation of the barrel bushing; and means for rotating a slotted rotatable plug attached to said means for rotating said barrel bushing.

22. Apparatus useful in disassembly of a firearm having a depressable plug proximate to a barrel bushing comprising:

first means for engaging a barrel bushing wherein rotation of said first means for engaging is accompanied by rotation of the barrel bushing;

means, operatively connected to said first means for engaging, for rotating said first means for engaging wherein said barrel bushing is rotated from a first position to a second position;

flange means extending outward from said first means for engaging wherein said flange means overlies the depressable plug during at least a portion of said rotation of said first means for engaging;

means for receiving said depressable plug when said first means for engaging is rotated to place said barrel bushing in said second position;

at least one stud attached to said flange in a position to contact a portion of said firearm when said first means for engaging has been rotated to place said barrel bushing in said second position;

second means for engaging a slot of a slotted rotatable plug and for rotating said slotted rotatable plug from a first position age and position;

means for depressing said rotatable plug a predetermined depth;

at least a second stud attached to said second means for engaging and positioned to contact a portion of said firearm when said second means for engaging has been rotated to position said slotted rotatable plug in said second position.

23. A method usable in partial disassembly of a firearm having a depressable plug adjacent to a barrel bushing comprising:

providing apparatus having a first means for engaging a barrel bushing wherein rotation of said means for engaging is accompanied by rotation of the barrel bushing and a second means for rotating a slotted rotatable plug wherein rotation of said second means is accompanied by rotation of said slotted rotatable plug;

using said first means for rotating said barrel bushing from a first position to a second position; and using said second means for rotating said slotted rotatable plug from a first position to a second position.

* * * * *